Sept. 13, 1960    F. G. KEYT    2,952,425

AUTOMATIC PILOTS FOR AIRCRAFT

Filed July 5, 1957

INVENTOR.
FERRIS G. KEYT
BY *Gordon Reed*
ATTORNEY

United States Patent Office 2,952,425
Patented Sept. 13, 1960

2,952,425

AUTOMATIC PILOTS FOR AIRCRAFT

Ferris G. Keyt, St. Louis Park, Minn., assignor to Minneapolis-Honeywell Regulator Company, Minneapolis, Minn., a corporation of Delaware Filed July 5, 1957, Ser. No. 670,016

15 Claims. (Cl. 244—77)

This invention relates to automatic condition control apparatus including manually operable means for changing the condition through the apparatus. The invention for purposes of illustration has been embodied in an automatic pilot for aircraft which craft includes a conventional pilot operated control stick for operating control surface positioning means.

One object of the invention is to provide novel means for controlling the surface positioning from the difference between the position of the control stick and the position of the surface positioning means, such difference being permitted by an elastic connection between said control stick and surface positioning means.

A further object of the invention is to control the surface positioning means in accordance with the signal derived from the differential position of the aircraft control stick and the positioning means, said signal being supplied by two paths, each including a time delay or lag circuit, to said positioning means.

A further object of the invention is to provide an arrangement whereby a control stick which forms part of a power boost surface positioner of an aircraft may be more rapidly adjusted.

A further object of the invention is to provide an autopilot for an aircraft with novel means to effect proper control of craft attitude from the aircraft control stick both at high and low airspeeds.

A further object of the invention is to provide novel means to control a servomotor for positioning a control device for controlling a condition by operation of a manually operable controller which is mechanically connected to said servomotor through an elastic connection and developing a motor control signal in accordance with the deformation of said mechanical connection.

A further object of the invention is to provide novel means to operate a servomotor means for an aircraft from a signal derived from a differential position of a control stick connected through an elastic member to said motor means whereby the control stick has the desired authority at high craft airspeed and the control stick has desired operating speed at low craft airspeeds.

Figure 1:
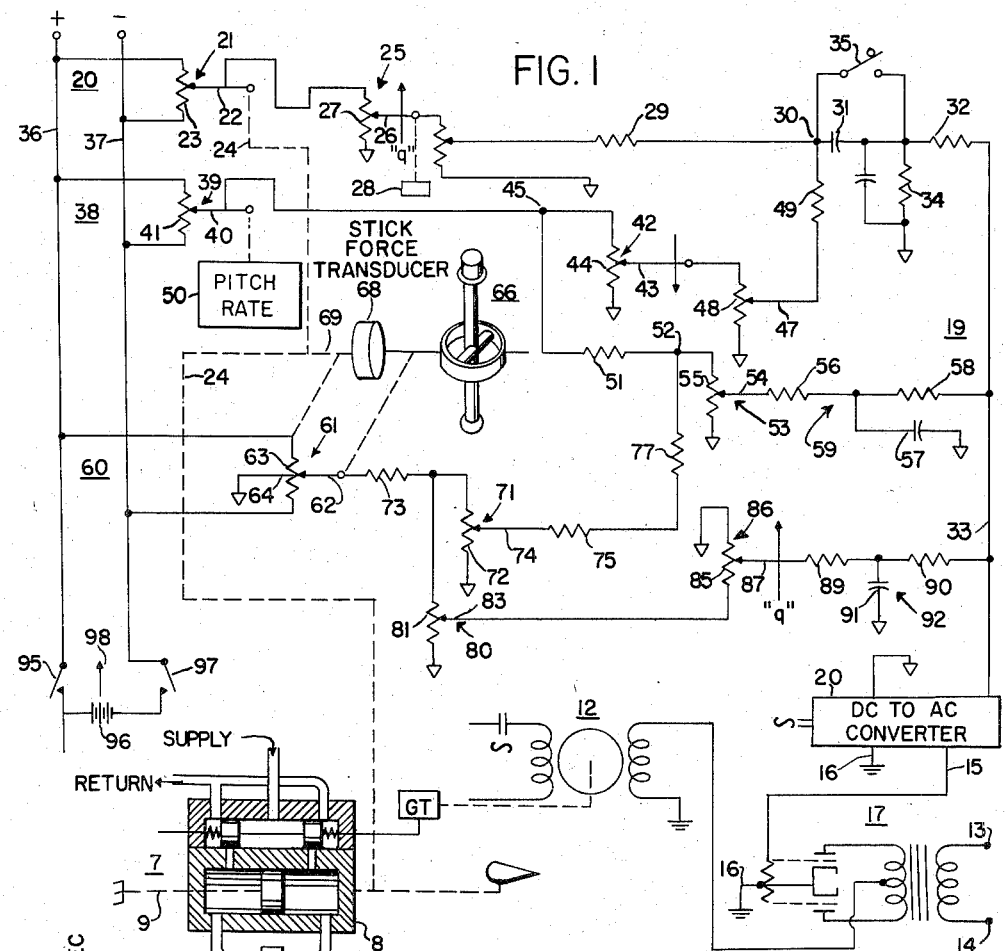
Figure 2:
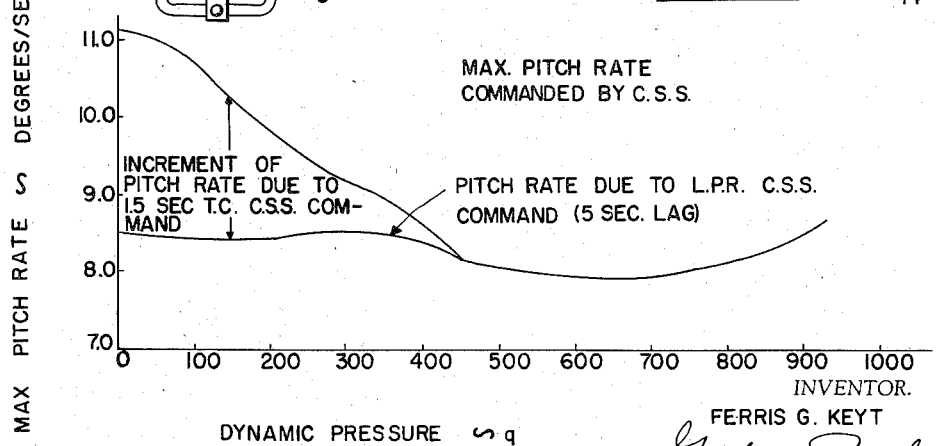

Other objects and structural details of the invention will be apparent from the following description when read in conjunction with the accompanying drawings, wherein:

Figure 1 is a schematic view of a signal producing balancable network constructed in accordance with the present invention; and Figure 2 is a diagram showing the control effects derived from parallel paths of a signal generator for said network.

The present invention relates to automatic pilots including provisions for control stick steering through the automatic pilot and such automatic pilot may be of the type disclosed in a prior application of Corles M. Perkins, Serial No. 553,131, filed December 14, 1955. Each channel of the automatic pilot incorporates a parallel summed D.C. resistance bridge. When a bridge is unbalanced by an error signal from a sensor or a command signal, the net unbalance is converted from a direct to an alternating signal and supplied to the servo amplifier for that channel. After amplification, the signal is fed to a phase sensitive discriminator, the output of which is transmitted to a servo actuated torque motor. The torque motor posisions a control valve which ports oil to the ram of a hydraulic servo actuator such as to position its associated control surface. As the ram of the servo moves, a followup signal is fed into the bridge to reduce the error signal to a level below the threshold of the amplifier. Such automatic pilots include a hydraulic servomotor for operating a control surface of an aircraft, and a linkage interconnects the conventional control stick of the airframe with the hydraulic servomotor output member such linkage including an elastic member whereby the control stick may be moved relative to the servomotor to thus develop a control signal. Such automatic pilot controls the servomotor through a control signal network which may include a rate gyroscope for damping craft motion about an axis. If the axis is taken as the pitch axis channel of the automatic pilot in which the present invention is arranged, the rate gyroscope will respond to craft pitch rates.

In some instances it is desirable to modify control signals derived by condition sensing means in such automatic pilot to provide short term stability of attitude rather than to control the condition sensed such as attitude rate. In such arrangement, the signal from the pitch rate gyroscope, for example, is supplied to the control means for the servomotor through a lag circuit to control the craft pitch attitude rather than craft pitch rate. In order that the control stick signal be properly phased relative to the pitch rate signal, it also is supplied to the servo control means through the lag circuit or lag network. The arrangement also prevents rapid stick movements from applying step signals into the network, because of the lag circuit.

While the above arrangement in general is satisfactory for controlling the aircraft from the control stick for the usual operating speeds of the craft, such control was not satisfactory when faster control stick and thus faster elevator surface movements were desired as when landing the aircraft or when performing aerobatics. By way of explanation, if the pilot moved the control stick until the entire elastic movement was taken up and since the stick was connected to the servo output, further movement of the control stick was resisted by the hydraulic servomotor. The pilot had to wait until the signal from the control stick signal generator was transmitted by the lag network to the servo control means to operate the servo. Thus subsequent operation of the servomotor would permit him to additionally move the control stick in the direction in which control was to be effected but it was apparent that only comparitively slow movements of the control stick could be actually effected.

In order that more rapid movement of the control stick could be effected and thus more rapid displacement of the elevator surface, a compensating or parallel feed from the control stick steering signal generator was applied to a network or control means for the servo. This parallel feed signal was supplied to the servo control means through a lag circuit having a shorter time constant than the first mentioned lag circuit and this provided rapid enough stick motion to accomplish the desired results for the flight operations involved.

Referring to Figure 1, a control channel of an automatic pilot in which the improved or compensation signal-producing means is included comprises a servomotor 7 of the hydraulic type. The servomotor comprises a cylinder assembly 8 connected to a pitch attitude changing means such as an elevator of an aircraft. The servomotor includes a ram assembly including a connecting rod 9 fixed to the frame of the aircraft. Relative motion of the ram and cylinder assembly is controlled by a control valve 11. Displacements of the valve 11 from normal position in either direction ports oil to either one or the other side of the ram causing displacement of the cylinder assembly relative to the ram. The valve 11 comprises conventional centering means such as springs. The displacement of the valve 11 from its spring centered position is provided by a torquer 12 through a suitable gear train GT. The torquer 12 is controlled from a discriminator-amplifier arrangement 17. The amplifier 17 in its discriminator section may include for example a double triode having its grid element connected to cathodes through a suitable biasing resistor and the cathodes are connected to conductor 16 to ground. The plates or anodes of the tubes are energized from a transformer having a primary winding whose end terminals 13, 14 are connected to an A.C. supply source. The transformer includes a secondary winding having a center tap connected to one end of an operating winding of motor torquer 12 which may be a capacitor type induction motor. This operating winding has its opposite end connected to ground which is common with the amplifier ground of conductor 16. The torquer 12 includes an additional operating winding connected also to the A.C. supply through a phasing capacitor. A.C. control signals are supplied to the amplifier 17 between a conductor 15 connected to the two grids and ground conductor 16.

The signals for controlling amplifier 17 are derived from a D.C. to A.C. converter 20 which may be of the vibrator type. The amplifier-torquer arrangement may be similar to that in the patent to Upton No. 2,423,534 or Beers No. 2,020,275, or to Taylor No. 2,388,350. The control valve 11 will be displaced from its normal position in one direction or the other depending on the phase relation of the control signal on conductors 15 and 16 relative to the A.C. voltage across terminals 13, 14. Upon the de-energization of the amplifier winding of motor 12, the valve 11 is returned by its centering means to normal position at which time no oil is ported to the ram of servo 7. If desired, the servo 7 may have the opposed ends of the cylinder assembly connected by a conventional fluid by-pass line with a control valve for closing off such by-pass line during operation of the servo 7.

D.C. voltages which are to be converted from D.C. to A.C. are supplied to the converter 20 from a summing conductor 33 of a balanceable voltage network 19.

Network 19 is arranged as a parallel summing, D.C. voltage, balanceable network. Balanceable, parallel summing, D.C. network 19 includes various sources of control signals comprising a servo position or follow-up signal generator 20, a rate signal generator 38, and a control stick steering operable signal generator 60.

Signal generator 20 comprises a rebalance potentiometer 21 having an adjustable slider 22 and resistor 23. Resistor 23 is connected across D.C. bridge supply conductors 36, 37. Slider 22 may be adjusted in either direction from the electrical center of resistor 23 by a suitable operating means 24 extending from the servo out member between cylinder assembly 8 and the elevator surface. A gain control potentiometer 25 includes a slider 26 and a resistor 27 having one end connected to slider 22 and its opposite end connected to signal ground which has the same potential as that of the midpoint of the D.C. supply to conductors 36, 37. The slider 26 may be adjusted by a "q" sensor 28 in accordance with increasing values of "q" in the direction indicated by the arrow associated with slider 26. Such "q" sensor is adjusted in accordance with the difference between impact and static pressures acting on the aircraft. Slider 26 in turn may be connected to a resistor of a follow-up adjustment voltage divider which in turn has its adjustable tap connected through resistor 29 to a terminal 30. Terminal 30 is connected through a capacitor 31 and summing resistor 32 in series to the summing conductor 33. The junction of capacitor 31 and resistor 32 is connected through a resistor 34 to signal ground. Capacitor 31 may be shunted by a single pole double throw switch 35; and the capacitor 31 serves to block the transmission of steady state signals at terminal 30 such as follow-up signals from signal generator 20 to summing conductor 33.

Signal generator 38 comprises a potentiometer 39 having an adjustable slider 40 and a resistor 41 which resistor is connected across the supply conductors 36, 37. The slider 40 is adjusted in either direction along resistor 41 by a pitch rate gyroscope 50 responsive to the craft pitch rate. Slider 40 is connected to a terminal 45 to supply pitch rate signals thereto. The pitch rate signal at terminal 45 is transmitted to conductor 33 by two electrical parallel circuits. One circuit comprises a pitch rate to elevator potentiometer 42 having an adjustable tap 43 and a resistor 44. The resistor 44 is connected between terminal 45 and signal ground. Slider 43 may be adjusted along resistor 44 in accordance with increasing values of "q" in the direction indicated by the arrow associated with slider 43. The slider 43 likewise may be positioned as slider 26 by a suitable "q" sensor. Slider 43 is connected through a pitch rate adjustment voltage divider comprising an adjustable tap 47 and voltage dividing resistor 48 and a further resistor 49 to terminal 30.

A lagged pitch rate to elevator circuit extends from terminal 45 to summing conductor 33. This lagged rate circuit includes a resistor 51 extending between terminal 45 and a second terminal 52. A lagged pitch rate adjustment potentiometer 53 comprising an adjustable tap 54 includes a voltage dividing resistor 55 having one end connected to terminal 52 and its opposite end connected to signal ground. Adjustable tap 54 is connected to summing conductor 33 through a lag circuit comprising two resistors 56, 58 in series. The junction of resistors 56 and 58 is connected to signal ground through a capacitor 57. Resistors 56 and 58 and capacitor 57 constitute a lag network 59 for the pitch rate signal derived from adjustable tap 54.

Signal generator 60 comprises a control stick steering potentiometer 61 having an adjustable slider 62 and a resistor 63. Resistor 63 is connected across D.C. supply conductors 36, 37 and a center tap 64 thereof is connected to signal ground. The aircraft includes a conventional control stick 66 conventionally mounted in a gimbal suspension for movement of the control stick in two planes respectively perpendicular. The control stick is connected through an elastic connection 68, constituting part of a transducer, and motion transmitting means 69 and 24 to the output member on cylinder assembly 8. The control stick 66 may be moved relative to the transmission means 69 due to the elastic link or resilient connection 68 which may be similar to that in Webb Patent No. 2,451,263, see elements 11, 29 thereof. When the stick is so displaced, upon release thereof the stick will return to unoperated position. The potentiometer slider 62 is connected to one side of the elastic connection and thus to the control stick 66 whereas the potentiometer resistor 63 is connected to the opposite side of the elastic connection and thus to the transmission means 69. Consequently, upon application of a force to the control stick 66 a relative displacement of the slider and the center tap 64 of potentiometer resistor results, and a control signal is developed.

The control stick steering signal on the potentiometer slider 62 is supplied through two separate electrically parallel lag circuits to the summing conductor 33. One parallel path comprises an elevator control stick steering adjustment or voltage divider 71 having its resistor 72 connected through a resistor 73 to slider 62 and the opposite end of resistor 72 is connected to signal ground. An adjustable tap 74 of voltage divider 71 is connected through a resistor 75 and resistor 77 in series to terminal 52.

A second parallel path for the control stick steering signal comprise a second control stick steering elevator adjustment or voltage divider 80 having a voltage dividing resistor 81 connected through resistor 73 to slider 62 and having its opposite end connected to signal ground. The voltage divider 80 includes an adjustable tap 83 which is connected to one end of a resistor 85 of a "$q$" scheduling potentiometer 86. The opposite end of the resistor 85 is connected to signal ground. The potentiometer 86 includes an adjustable tap 87 which is adjusted for increasing values of "$q$" in the direction indicated by the arrow associated with the adjustable tap. The adjustable tap 87 is connected through resistors 89, 90 connected in series to summing conductor 33. A capacitor 91 connects the junction of resistors 89, 90 to signal ground. The resistors 89, 90 and capacitor 91 form a lag circuit or network 92 for the signal derived from the "$q$" scheduled potentiometer 86. This lag circuit or network has a time constant of from 1 to 1.5 seconds and typical values of its components are resistor 89 is 200 kilohms, resistor 90 is 5.1 megohms and capacitor 91 is 30 microfarads. On the other hand the time constant of the lag circuit 59 comprising resistors 56, 58 and capacitor 57 is about five seconds and typical values for the elements of this lag circuit are resistor 56 is 43,000 ohms, resistor 58 is 330,000 ohms, and capacitor 57 is 480 microfarads.

The supply conductor 36 may be connected through a single pole single throw switch 95 to one side of a D.C. supply source such as a battery 96. The supply conductor 37 may be connected through a single pole single throw switch 97 to the opposite side of battery 96. The supply source 96 includes a center tap 98 having a potential corresponding with signal ground of the signal generators.

Passing to Figure 2, this figure is in a form of a graph which shows the maximum pitch rate commanded by operation of the control stick 66. In this graph, the maximum pitch rates in degrees per second are plotted as ordinates against dynamic pressure "$q$" as abscissae. The dynamic pressure "$q$" is given in terms of pounds per square inch. By way of explanation of the curves on the graph, the continuous and generally horizontal curve extending from zero abscissae rightward to a value of "$q$" of 900 is the signal obtained from the lag network 59 having a time constant of roughly five seconds. The graph beginning at zero abscissae and having a corresponding value of 11.1 degrees per second and extending rightward and intersecting the first curve at a value of "$q$" of about 460 is the signal obtained from the lag circuit 92 having a time constant of about one second. By means of the "$q$" scheduling of the latter signal, when the value of "$q$" is in excess of 460 the control stick steering signal is obtained solely from the upper lag circuit 59 of the Figure 1 drawing, whereas for values of "$q$" under 460 the total signal from operation of the control stick steering potentiometer 61 is obtained through both lag circuits 59 and 92. Thus at lower "$q$" values as when the aircraft is at landing speeds, higher control stick steering signals are available to network 19 for slight displacements of the control stick so that large displacements of the cylinder assembly and rebalance potentiometer 21 occur and large elevator control surface are available for sudden maneuvers, if desired, when the craft is approaching a landing. The mathematical expression for the transfer function of the two control stick steering signal branches is as follows: with $K_1$ the gain of the upper branch of the figure, $T_2$ the time constant, and $K_2$, $T_3$ being similar terms for the lower branch.

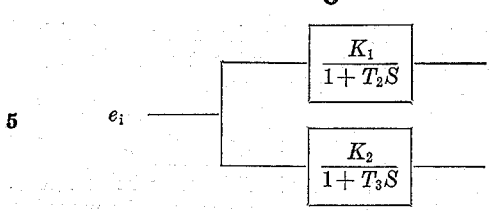

$$e_o = \left[\frac{K_1}{1+T_2 S} + \frac{K_2}{1+T_3 S}\right] e_i$$

$$\frac{e_o}{e_i} = \frac{K_1 + K_1 T_3 S + K_2 + K_2 T_2 S}{(1+T_2 S)(1+T_3 S)}$$

$$\frac{e_o}{e_i} = \frac{K_1 + K_2 + K_1 T_3 S + K_2 T_2 S}{(1+T_2 S)(1+T_3 S)}$$

$$\frac{e_o}{e_i} = (K_1 + K_2) \frac{1 + \frac{K_1 T_3 S + K_2 T_2 S}{K_1 + K_2}}{(1+T_2 S)(1+T_3 S)}$$

$$= \left(\frac{K_1 + K_2}{1 + T_2 S}\right) \frac{1 + \frac{(K_1 T_3 + K_2 T_2) S}{K_1 + K_2}}{1 + T_3 S}$$

It will be noted that the second factor has a frequency response curve of a lead circuit to thus decrease the overall lag. If $K_2$ goes to zero, i.e. "$q$" increases beyond 460, the function reduces to:

$$K_1 \frac{1 + \frac{K_1 T_3 S}{K_1}}{(1+T_2 S)(1+T_3 S)}$$

$$K_1 \frac{1 + T_3 S}{(1+T_2 S)(1+T_3 S)} = \frac{K_1}{1+T_2 S}$$

It is evident that the control moment that a displaced elevator surface has on an aircraft increases with "$q$" on the craft and higher or greater control surface displacements are required at lower airspeeds than at high for the same control moment to obtain quick response of the craft. The five-second time constant lag pitch rate control was suitable at higher "$q$" values. The control stick could be moved fairly fast. However the feel of control stick steering under these conditions was not all that was desired by the pilot. It would be desirable for satisfactory feel for the craft to move with stick movements or that craft movement be in phase with stick movement. Thus the control stick feel with the single lag circuit 59 is not optimum. With control stick steering authority gain set for the desired feel at high airspeeds, the gain and speed of possible stick motion at low speeds was much too low causing over control since too much control stick steering signal was applied because of the lag provided by the lag circuit. In other words the pilot would move the control stick to initiate a maneuver but due to the time lag in the first lag network 59 the pilot would have exhausted the permissible displacement of the stick 66 through the elastic member. After a period determined by the time constant of the lag network 59 the aircraft control system would receive a control signal to displace the elevator surface. However at this time the pilot would have been forcing the control stick to its limit of displacement in order to obtain some response of the craft to stick motion and this additional effort which caused a large control signal would result in an over control of the craft.

By providing the second or compensating control stick steering signal through a control circuit 92 having a smaller time lag rapid enough stick motions were permitted to accomplish the desired results. Thus high pitch rates which are desired from control stick steering at low "$q$" values as when landing were obtained. The signal from the short time constant network was not needed at higher "$q$" values, and since the above solution is varied both the speed of stick motion and control stick steering gain with but one scheduling function namely that from "$q$" sensing appeared optimum.

Viewed in another manner the normal acceleration of the number of "G's" on an aircraft depends upon the craft pitch rate which may be initiated from the pilot's control stick. If the number of "G's" are to be held to near constant value, the elevator surface must be moved more rapidly at low "$q$" values than at high "$q$" values since smaller rates of movement of elevator surface are required at high "$q$" values to obtain a predetermined craft pitch rate. By the additional lag circuit, the elevator surface may be moved more rapidly at low "$q$" values.

It will now be apparent that there has been provided an improved pitch attitude control channel of an automatic pilot provided with control stick steering and utilizing a compensation lag circuit at low "$q$" values which yields substantially as desirable performance of the craft at low "$q$" values as is obtained at high "$q$" values and provides a natural "feel" to the control stick steering whereby the aircraft moves substantially in synchronism with the control stick.

While but one embodiment of the invention has been described, it will be obvious to those skilled in the art that numerous alterations and modifications may be made in the invention disclosed without departing therefrom and it is therefore the purpose in the appended claims to include such variations that fall within the true spirit and scope of this invention.

What I claim is:

1. An apparatus for controlling the attitude of an aircraft having attitude changing means and servo means operating the attitude changing means, comprising: a balanceable voltage summing network controlling the servo means; a manually operable signal voltage generator; a first lag network having a time constant and connecting said generator to said balanceable network; a second connecting means including a second lag network having a shorter time constant than the first lag network connecting the generator to the balanceable network; and further means responsive to a flight condition of the aircraft modifying the gain of said second connecting means, said second lag network at one range of magnitudes of said condition decreasing the response time of the aircraft to operation of the manual signal generator over that obtained from the first lag network alone.

2. The apparatus of claim 1, wherein the further means is responsive to a function of the external impact minus static differential air pressure on the craft while in flight.

3. The apparatus of claim 2, wherein the gain is modified inversely with increase in impact minus static differential air pressure on the craft.

4. The apparatus of claim 1, wherein the balanceable network simultaneously transmits control signals through both lag networks to said network from the signal generator.

5. In an automatic pilot for an aircraft having attitude changing means and motor means for operating said attitude changing means, control means including a balanceable network operating said motor means; a signal generator responsive to craft pitch rate; a first lag network connecting said generator to said network to apply thereto a signal varying with craft pitch rate; an operable signal generator; means connecting the operable signal generator to said first lag network to thereby cause the output of said operable signal generator to be in phase with the pitch rate of said craft; a second lag network means having a different time constant than said first lag network simultaneously connecting said operable signal generator to said balanceable network; means for modifying the gain of the second lag network means; whereby the joint effects of said lag networks are to decrease the lag of the output of the operable signal generator transmitted to said balanceable network.

6. In the apparatus of claim 5, wherein the operable signal generator is positioned by a control stick of the aircraft through suitable operating means.

7. The apparatus of claim 6 wherein the suitable operating means includes a stick force transducer connected between the control stick and the motor means.

8. In an autopilot for an aircraft having a movable control surface arranged to control craft attitude about a first axis and servo means for moving said control surface, in combination: follow-up means for producing a first signal voltage proportional to the displacement of the servo means from a normal position; manually operable generator means for producing a second signal voltage; a first electrical lag network having a time constant connecting said manually operable signal generator to said servo means for control thereof; a second electrical lag network having a shorter time constant than the first lag network simultaneously connecting said manual signal generator to said servo means thereby increasing the control of the servo means derived from the second signal; and further means connecting said follow-up means to said servo means to oppose the first signal from said follow-up means to said control from said second or manual signal.

9. A control apparatus for an aircraft having a movable control surface, a servo motor for moving the same, and a pilot's control stick, in combination: an elastic connection between said control stick and servo motor; a first signal voltage generator arranged to be actuated in accordance with the deformation of said elastic connection; control means for said servo motor; a first electrical lag circuit having a time constant and connecting said first signal voltage generator with said control means; a second electrical lag network having a shorter time constant than the first lag network connecting said first signal voltage generator and control means; means for producing a second or a follow-up signal proportional to the displacement of said motor means and connected to said control means in opposition to the signals applied thereto by the two lag networks from said first signal generator.

10. Control apparatus for an aircraft for operating the control surface thereof in accordance with the movement of a control device, said apparatus comprising: a servomotor operating said surfaces; a pilot's control stick; an elastic connection for transmitting operating force between said control stick and said servomotor; an electric voltage signal generator actuated by said elastic connection; a control device for operating said servomotor; a lag circuit interconnecting said signal voltage generator and said control device; and means responsive to the differential of the impact air pressure and static air pressure on the craft for adjusting the voltage gradient of said signal generator utilized in said lag network.

11. In apparatus for manually controlling the attitude of an aircraft having attitude changing means and servomeans operating the attitude changing means, in combination: control means operating said servomeans; a manually operable aircraft control stick force signal voltage generator; transmitting means, whereby said voltage generator is connected to said control means for control thereof and thereforeeffecting positioning of said servomeans in the direction of application of stick force; airspeed responsive means; additional means also connecting said stick force signal voltage generator and control means; and means for adjusting said additional means from said airspeed responsive means so that the magnitude of the stick force signal transmitted decreases as air speed increases thereby increasing the control derived from the stick force signal voltage generator on the control means at low airspeeds.

12. In a control system for an aircraft having an attitude changing device, a variable magnitude signal generator biased to a normal position, servo means having an operable member positioning said attitude changing device, control means connected to said servo means, means connecting said generator to said control means for control thereof and thus positioning said member, further means additionally providing a connection from the signal generator to said control means said further means having an adjustable gain arrangement, and means responsive to the airspeed of the craft for adjusting said gain arrangement to provide increased control of said servo means by said generator at a predetermined airspeed.

13. The arrangement of claim 12, wherein an elastic connection between said signal generator and operable member biases said signal generator.

14. In a control system having a condition changing device, a servomotor displacing said condition changing device, an operable member, an elastic link interconnecting said member and servomotor, signal generator means responsive to relative movement of said member and servomotor producing a control signal voltage, control means for said servomotor, first means connecting said signal generator means to said control means, second means additionally connecting said signal generator means to said control means for additional control thereof, and means responsive to an environmental condition of said control system for modifying the effect of said generator on said control means through one of said connections.

15. In a control system having a servo means, said servo means comprising an operating member positioning a condition changing device, a displaceable controller, elastic means interconnecting said controller and operating member and generating a first signal on relative displacement of the controller and member, control means connected to the servo means for operation thereof, condition change rate means generating a second signal connected to said control means, first means connecting said elastic means to said control means for control thereof, second means additionally connecting said last elastic means and control means for additional control thereof, and means responsive to an environmental condition of said system for varying the relative control effected by said elastic means through said first and second connecting means on said control means.

References Cited in the file of this patent

UNITED STATES PATENTS

| | | |
|---|---|---|
| 2,451,263 | Webb | Oct. 12, 1948 |
| 2,604,613 | Klass | July 22, 1952 |
| 2,623,717 | Price | Dec. 30, 1952 |
| 2,770,428 | Vogel | Nov. 13, 1956 |
| 2,770,429 | Shuck | Nov. 13, 1956 |
| 2,809,000 | Brannin | Oct. 8, 1957 |